(No Model.) 7 Sheets—Sheet 2.

R. EICKEMEYER.
DYNAMO ELECTRIC MACHINE.

No. 358,340. Patented Feb. 22, 1887.

Attest:
Philip F. Larner.
Howell Battle.

Inventor:
Rudolf Eickemeyer.
By [signature]
Attorney.

(No Model.)  7 Sheets—Sheet 3.
R. EICKEMEYER.
DYNAMO ELECTRIC MACHINE.

No. 358,340. Patented Feb. 22, 1887.

Attest:
Philip F. Larner
Howell ____

Inventor:
Rudolf Eickemeyer
By ____
Attorney.

(No Model.) 7 Sheets—Sheet 4.

R. EICKEMEYER.
DYNAMO ELECTRIC MACHINE.

No. 358,340. Patented Feb. 22, 1887.

Attest:
Philip F. Larner
Lowell Bartlett

Inventor:
Rudolf Eickemeyer
By ___ Attorney

N. PETERS, Photo-Lithographer, Washington, D. C.

(No Model.) 7 Sheets—Sheet 5.
R. EICKEMEYER.
DYNAMO ELECTRIC MACHINE.

No. 358,340. Patented Feb. 22, 1887.

(No Model.) 7 Sheets—Sheet 6.

R. EICKEMEYER.

DYNAMO ELECTRIC MACHINE.

No. 358,340. Patented Feb. 22, 1887.

(No Model.) 7 Sheets—Sheet 7.

R. EICKEMEYER.
DYNAMO ELECTRIC MACHINE.

No. 358,340. Patented Feb. 22, 1887.

Attest:
Philip F. Larner
Lowell Bartle

Inventor:
Rudolf Eickemeyer
By [signature] Attorney

N. PETERS, Photo-Lithographer, Washington, D. C.

UNITED STATES PATENT OFFICE.

RUDOLF EICKEMEYER, OF YONKERS, NEW YORK.

DYNAMO-ELECTRIC MACHINE.

SPECIFICATION forming part of Letters Patent No. 358,340, dated February 22, 1887.

Application filed March 2, 1885. Serial No. 157,545. (No model.)

*To all whom it may concern:*

Be it known that I, RUDOLF EICKEMEYER, of Yonkers, in the county of Westchester and State of New York, have invented certain new and useful Improvements in Dynamo-Electric Machines or Electric Generators; and I do hereby declare that the following specification, taken in connection with the drawings furnished and forming a part thereof, is a clear, true, and complete description of the several features of my invention.

My said improvements are applicable, generally, to such machines as embody an active mechanical element or armature on which one or more conductors or coils of conducting-wire are carried, and involve the use of a commutator or equivalent device for taking off the electricity generated, or for applying electricity to the machine if it be used as a motor.

The prime object of my said improvements is to concentrate the exciting force of the helix upon the armature-core, and, briefly stated, I accomplish that end by encircling the armature-core, composed of magnetic metal, with an exciting-helix, and by inclosing the whole within a shell of magnetic metal, which affords proper cheeks or pole-faces, and will complete the magnetic circuit, which includes the armature-core and the cheeks, whereby a machine having a given quantity of metal properly proportioned in the several elements will operate with a maximum capacity. The inclosure of the exciting-helix within a mass of magnetic metal, which also surrounds the armature, I believe to be broadly new, and that feature has been heretofore practically embodied in such so called "unipolar machines" as were devised by me, several of which are shown and described in my application for Letters Patent filed November 8, 1882, Serial No. 76,234. In some of my said unipolar machines the exciting helix or helices were so located with reference to the armature as to surround the core thereof, but not the conductors thereon, and in others said helices encircled the conductors. I am, as I believe, the first to also so organize in a bipolar machine a magnetic shell and exciting-helix that the armature-core or the core and the conductors thereon are encircled by or inclosed within the exciting helix or helices.

With this statement of the gist of my invention, it is to be understood that I do not limit the main feature thereof to any particular construction of the armature, although under certain other features it should embody a core of magnetic metal; nor to any special form of construction of the exciting-helix or the inclosing magnetic shell, or of means for taking off or applying electricity, having practically demonstrated its value in many machines in great variety of construction of the parts and in their arrangement with relation to each other. As, for instance, in bipolar machines the special form of commutator employed is in no manner connected with my invention, so, also, may the armature be varied in form and construction, whether cylindrical or ring-shaped, or in the form of a disk, and their electric conductors may also be variously constructed and arranged; so, also, whatever the form of armature, the exciting helix or helices may be arranged to encircle it, either concentrically or diametrically, or both, or at any intermediate angle; and the inclosing magnetic shells may also be varied in form and construction, so as to properly serve their purpose in each case in properly co-operating with the particular form and arrangement of the helix or helices and of the armature employed.

Although all of the machines illustrated in the drawings will be described as having armatures containing magnetic metal, it is, however, to be understood that the novel feature of surrounding the armature-conductors by an exciting-helix and inclosing both within a shell of magnetic metal is desirable in all machines wherein the magnetic circuit is alternately cut in opposite directions by conductors during the rotation of the armature, whether said machines are of the bipolar or the multiple-polar varieties.

Various minor features of value have been devised by me, which will be specified in the several clauses of claim hereunto annexed, after describing in detail the different machines illustrated in the drawings, in which—

The machine shown in Figs. 1 to 4, inclusive, has a cylindrical shell, A, composed of iron, constructed in two or more parts, secured together by bolts and having a base, $a$, by which said shell may be securely planted upon a suitable foundation, and said shell being provided with suitable brackets, $b$, serves as the frame of the machine. The said shell is cylindrically chambered to receive the armature B, and also centrally chambered or recessed to receive an exciting-helix, C, of slightly greater interior diameter than the armature. For reducing the weight of metal in said shell to its minimum requirement it is cut away at each end at diagonally-opposite points, thus developing diagonally-opposite semi-cylindrical or concave cheeks or pole-faces $c\ c'$, as clearly shown. The brackets $b$ are bolted to the outer ends of these cheeks, and have bearings for the shaft or axis $d$ of the armature, and one of these also supports the commutator-brushes D. At one end of the armature-shaft is a belt-pulley, $e$, and at the other the commutator-hub $f$. The armature B, as here shown, is cylindrical in form, having an electric conductor, $g$, wound thereon longitudinally upon a core of magnetic metal, in a well-known manner, and peripherally secured by bands, as shown. The core of the armature constitutes a portion of the electro-magnet. In this machine the exciting-helix will develop opposite poles at the two ends of the armature-core and at the cheeks $c\ c'$, and the cylindrical portion of the inclosing-shell completes the magnetic circuit. The operation of this machine is as follows: When the exciting-helix is included in an electric circuit, the armature-core and cheek-pieces are polarized and a magnetic circuit is produced, which includes the armature-core longitudinally and is completed by that portion of the casing which surrounds the helix and connects the cheek-pieces. The magnetic circuit is cut between the armature-core and the cheeks or pole-faces, and a current of electricity is produced in the conductors while passing the cheek-pieces when the armature is rotated.

Figure 1:
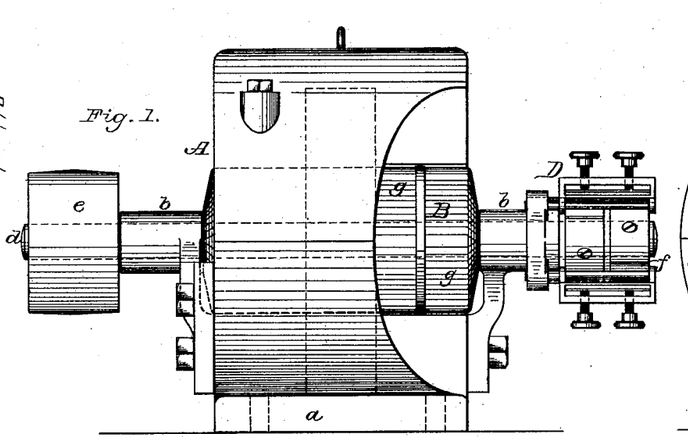
Figure 1, Sheet 1, is a side elevation of a complete machine, in which the exciting-helix is concentric with a cylindrical armature, in accordance with my invention.
Figure 2:
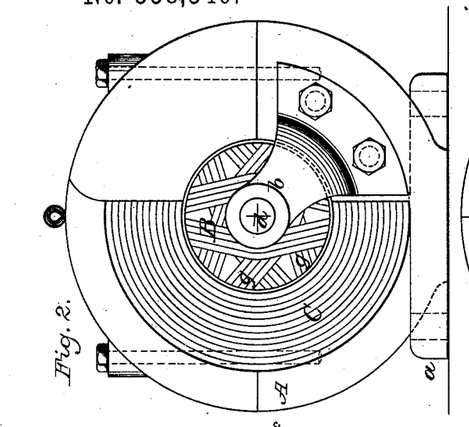
Fig. 2 is an end view of the same without the driving-pulley.
Figure 3:
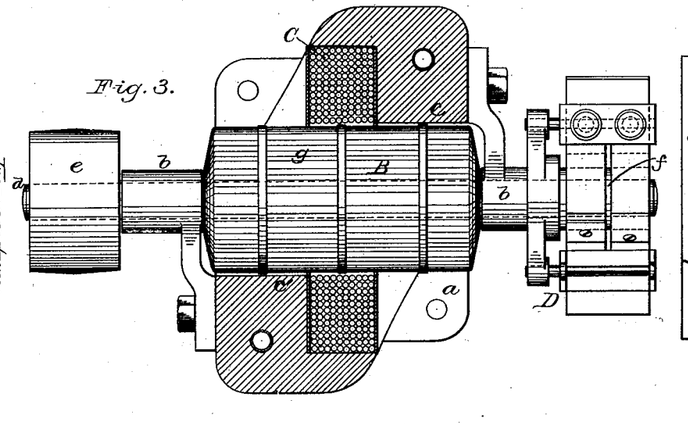
Fig. 3 is a top or plan view of the same, with the magnetic shell and exciting-helix shown in section.
Figure 4:
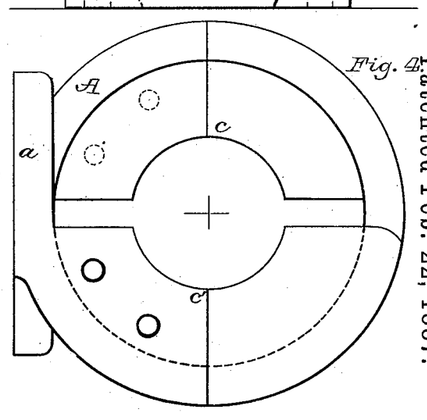
Fig. 4 is an end view of the magnetic shell of the machine, all interior parts being removed.
Figure 5:
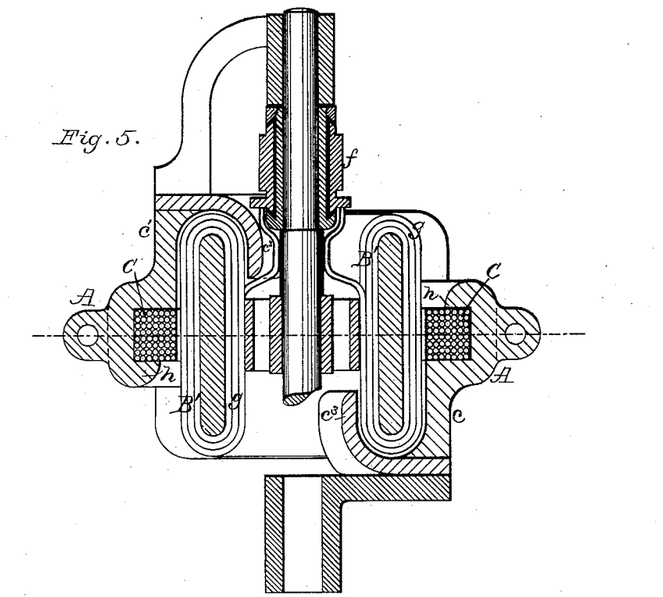
Fig. 5, Sheet 2, illustrates in section a machine having an armature of the ring form, and a concentric exciting-helix.
Figure 6:
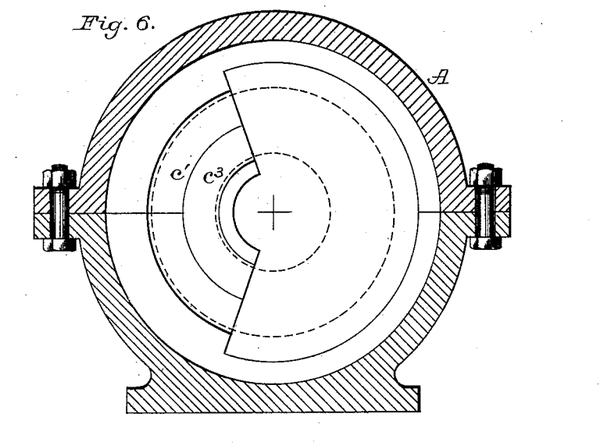
Fig. 6 is a vertical central cross-section of the magnetic shell of the machine shown in Fig. 5.

In Figs. 5 and 6, Sheet 2, I show a machine having a ring-armature, B'. The helix is centrally located, surrounds the armature concentrically, and is housed within the magnetic shell A generally, as hereinbefore described, in connection with Fig. 1; but said shell in this machine more thoroughly incloses the helix C, as shown at $h$, and the pole-faces $c$ and $c'$ are each provided with inwardly-curved plates, as at $c^3$, so as to better inclose the coincident end portions of the armature-ring and its conductor $g$, which is wound longitudinally on the rim of the ring in a manner well known, and has the usual terminals at the commutator-hub $f$. In this machine the exciting-helix will directly polarize the two ends of the armature-core and develop opposite poles at the faces $c\ c'$, and the cylindrical portion of the inclosing-shell, with the core of the armature, completes the magnetic circuit.

Figure 7:
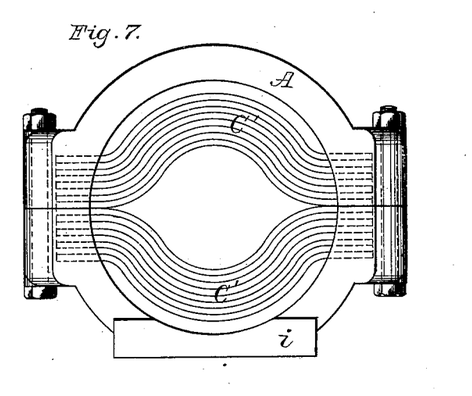
Fig. 7, Sheet 3, is an end view of a magnetic shell and an exciting-helix arranged to receive and encircle a ring-armature diametrically instead of concentrically, as shown in Fig. 5.
Figure 8:
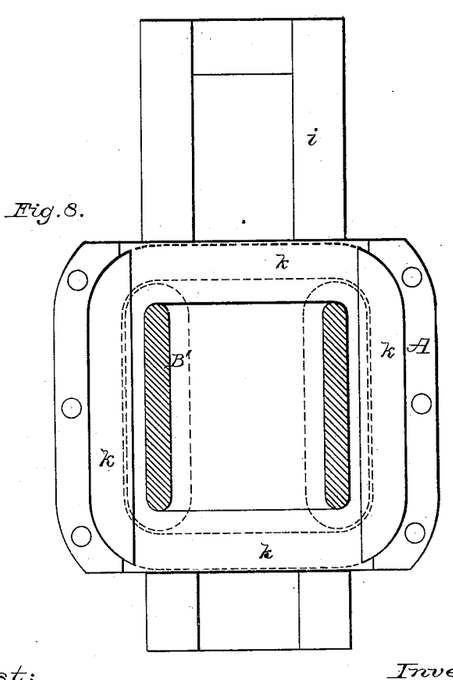
Fig. 8 is a plan view of the lower half of the shell shown in Fig. 7, and, in dotted lines, indicates the position of the lower half of the exciting-helix, and also the conducting-coils on the ring-armature, the rim of which is shown in section.

In Figs. 7 and 8, Sheet 3, I show a machine having a ring-armature, B', similar to that shown in Figs. 5 and 6. The magnetic shell A differs in form and construction from those before described, because the exciting-helix C' surrounds the armature diametrically, or from end to end, its wire being oppositely curved in a vertical plane at each end of the machine, for affording the requisite central opening for the reception of the core or shaft of the armature. For this shell a bed-plate, $i$, is provided as a foundation for supporting the requisite bearings for the armature-shaft. In Fig. 8 the lower half of the shell A is shown, clearly indicating in dotted lines at $k$ the portion thereof occupied by the lower half of the exciting-helix, and it will be seen that the armature B' is located within the space which is inclosed horizontally by said helix when in position, as shown in Fig. 7. The two halves of this helix may be coupled together so as to operate as one, or either half may be cut out from the exciting-current, if desired. In this machine the exciting-helix will directly polarize the upper and lower sides of the armature-core, and develop opposite poles at the upper and lower portions of the shell, the sides thereof and the core of the armature completing the magnetic circuit.

Figure 9:
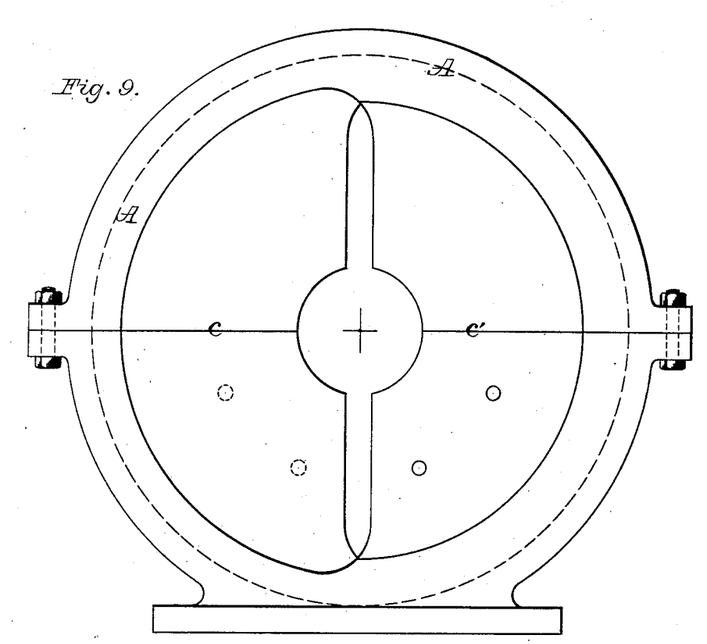
Fig. 9, Sheet 4, is an end view of a magnetic shell adapted to receive a disk-armature and a concentric helix.
Figure 10:
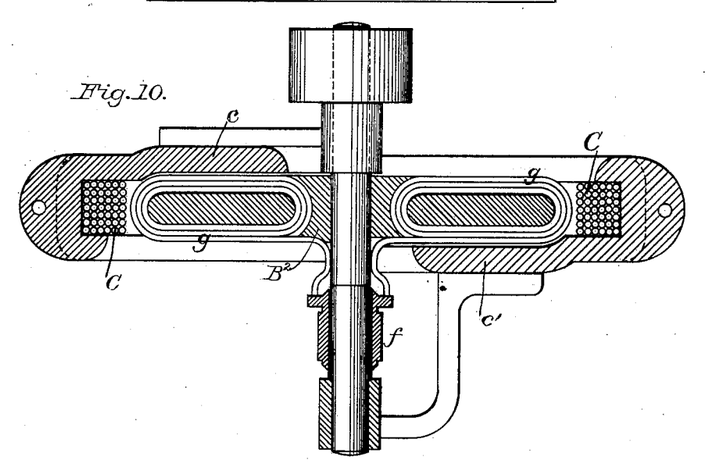
Fig. 10 is a horizontal section of the same, and also of the armature and helix.

In Figs. 9 and 10 I show a machine having a disk-armature, $B^2$, carrying a conductor, $g$, which terminates at the commutator-hub $f$. In this case the magnetic shell A serves as the frame of the machine, and has brackets supporting bearings for the axis or shaft of the armature, as before described; but it will be seen that in this machine the shell affords flat pole-faces or cheeks $c$ and $c'$, which are semicircular in outline, and are coincident with diagonally-opposite sides of the disk-armature. The exciting-helix C is inclosed by the shell, and said shell and helix incloses the armature peripherally, substantially as with the ring-shaped and also as with the cylindrical armatures. In this machine the exciting-helix develops opposite poles on the two sides of the armature and at the flat faces $c$ and $c'$, and the inclosing portion of the shell, with the core of the armature, completes the magnetic circuit.

Figure 11:
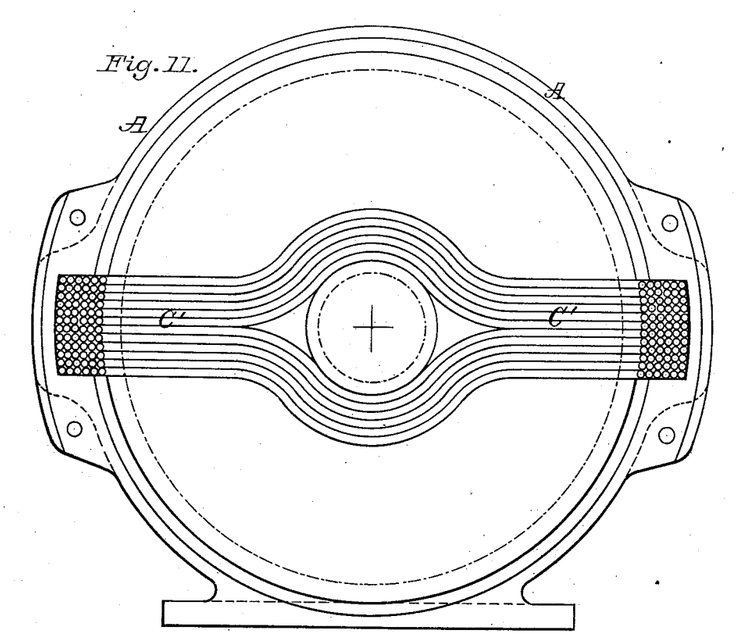
Fig. 11, Sheet 5, is a vertical central section of a magnetic shell and a helix adapted to surround a disk-armature diametrically.
Figure 12:
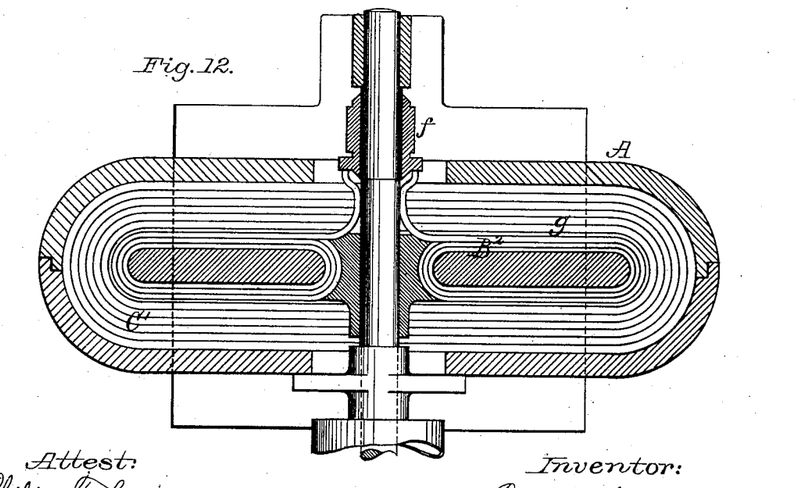
Fig. 12 is a horizontal section of the same with the armature in position.

In Figs. 11 and 12 I show a machine having a disk-armature, $B^2$, conductors $g$, and commutator-hub $f$, as last described. The magnetic shell A, as here shown, has a bed-plate on which the requisite bearing-standards are mounted, and it is composed of two parts, each concavo-convex, so that when put together they wholly inclose the disk-armature, and also inclose the exciting-helix $C'$, which, as shown in Figs. 7 and 8, incloses the armature diametrically, and at each of its sides is so formed as to afford a central aperture for the reception of the axis or shaft of the armature. In this machine the exciting-helix will develop opposite poles at the upper and lower portions of the armature, and at the upper and lower portions of the shell and the remaining cylindrical portions of the shell will, with the core of the armature, complete the magnetic circuit.

Figure 13:
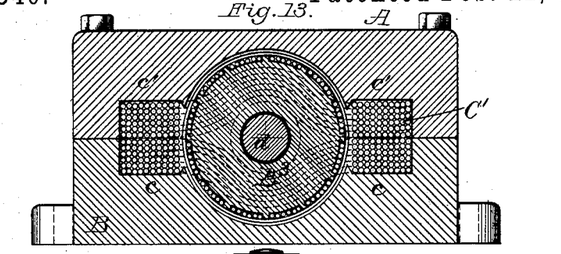
Fig. 13, Sheet 6, is a central vertical cross-section of a machine having a cylindrical armature, inclosed diametrically by an exciting-helix.
Figure 14:
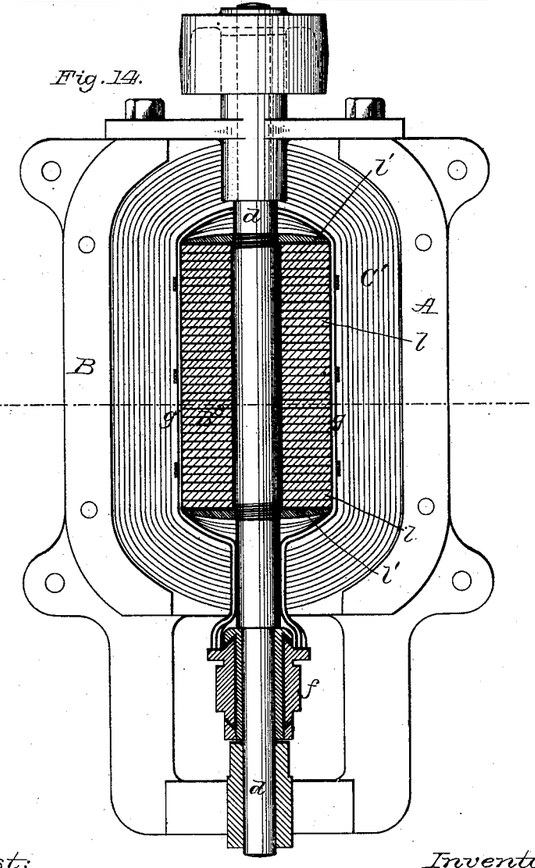
Fig. 14 is a longitudinal section of the same, the lower halves of the shell and helix being shown in top view.

In Figs. 13 and 14 I show a machine having an armature, $B^3$, of cylindrical form, having a shaft, $d$, and a commutator-hub, $f$, as before described. The body of the armature is composed of numerous disks, $l$, of soft iron, insulated from each other and firmly clamped upon the shaft between suitable heads, $l'$. The armature-conductors $g$ are wound longitudinally, as before described, and are connected to the commutator-hub in the usual manner. The exciting-helix $C'$ is housed within the shell A, and surrounds the armature longitudinally or diametrically instead of concentrically, thus developing opposite poles at the upper and lower portions of the armature-core and at upper and lower portions of the shell, the remaining portions of the shell, with the core of the armature, completing the magnetic circuit. As before described in connection with other machines having a similarly-arranged helix, the ends of the latter are so divided as to afford a central space for receiving the axis of the armature, and a bed-plate is also provided for affording the requisite support for the armature-bearings at one end, and at the opposite end of the machine a cross-bar bolted to the end of the shell supports the adjacent bearing.

Figure 15:
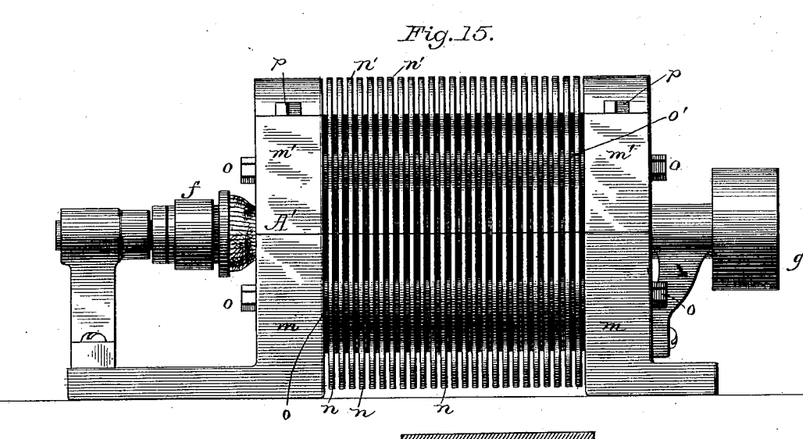
Figs. 15 and 16, Sheet 7, in side elevation and vertical cross-section, illustrate a similar machine with a shell of different construction.
Figure 16:
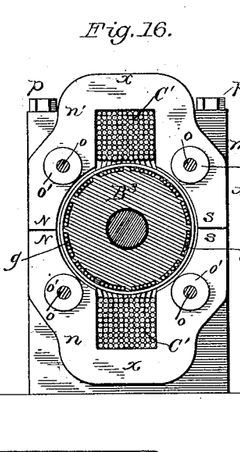
Figure 18:
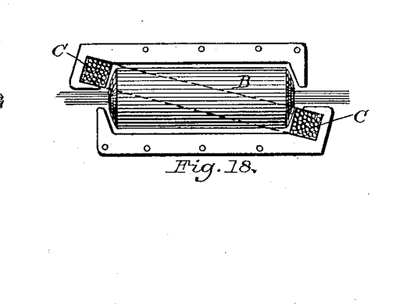
Fig. 18 is a diagrammatic view of a machine, in section, containing an exciting-helix angularly arranged with reference to the chamber which receives the armature.

In Figs. 15 and 16 I show a machine in some respects similar to that last described, but differing therefrom in the arrangement of its parts and in the character of the inclosing magnetic shell. In such of my machines hereinbefore described as have the exciting-helix arranged to surround the armature longitudinally, said helix occupies a substantially horizontal position; but, as hereinbefore indicated, its arrangement in this respect can be widely varied without materially affecting the results; and the same is true in those machines in which the exciting-helix is concentric with the armature. In other words, as clearly indicated in Fig. 18, the helix may be arranged angularly to the axis of the armature in lieu of at right angles thereto, or in the same plane therewith, whether horizontally or vertically.

In the machine shown in Figs. 15 and 16 the exciting-helix occupies a substantially vertical plane and longitudinally surrounds the armature $B^3$, which in form is similar to that last described, and it may or may not embody the disks $l$. The magnetic shell in this machine embodies novel features in construction, which have been devised with special reference to lightness, efficiency, and the free discharge of such heat as is necessarily involved in the operation of mechanical electric generators. This shell A embodies four main sections of cast-iron, two of which form each end of the shell, the lower sections, $m$ $m$, having extensions or brackets on which are mounted the armature-bearings, and the upper sections, $m'$ $m'$, constitute the upper halves of said shell at each end. Between these main sections are a series of soft wrought-iron plates or flat ribs, $n$ $n'$, placed edgewise and having a contour substantially corresponding to the cross-sectional contour of the cast-iron sections, as clearly shown in Fig. 16, and they are united to their respective cast-iron section by rods or bolts $o$, and on said bolts there are loose collars or washers $o'$ interposed between said plates, thus skeletonizing the entire shell between said cast-iron heads or ends, and exposing the armature and the interior of the shell to the cooling influences of freely-circulated air. The collars $o'$ are preferably composed of insulating material, and the plates are also preferably insulated from the bolts $o$. The composite magnetic shell, thus composed of two upper and lower parts, is firmly united by vertical bolts $p$. The interior of the shell affords the requisite cylindrical chamber for the armature and the longitudinal recesses for the reception of the exciting-helix $C'$, which polarizes the metal in the shell, including the plates or ribs $n$ $n'$, and developes opposite poles N and S at the two sides of the shell, and also at both sides of the armature when in place, and each of the plates or ribs is a complete electro-magnet. In this machine the armature-conductors $g$ and the commutator-hub $f$ are as before described.

With an understanding of the several machines described, it will be obvious that the main feature of my invention is wholly independent of any special mechanical features, and also of any precise arrangement of the several parts which are essential in all machines of this general class; and it is to be understood that while I have in each instance shown and always prefer to use exciting-helices which are directly coincident with portions of the armature, I do not limit myself thereto, because similar results will accrue if thin non-magnetic metal be interposed between the helices and the armature, so long as said helices directly polarize the shell and armature and are surrounded by or inclosed within said shell.

In the construction of armatures more or less iron is always employed, and this will in each case be directly polarized and included or embraced within the magnetic circuit or circuits developed by the exciting-helix, substantially as in the so-called unipolar machines which were described and illustrated in my aforesaid application for Letters Patent.

I have not illustrated the terminals of the exciting-helices, nor the conductors by which they may be coupled to the commutator, such matters being readily understood by persons skilled in the art, and quite immaterial for the purposes of this specification.

In the matter of relative proportions of the shell, the helix, and the armature, I will state that the drawings fairly indicate said proportions, they being reductions from working drawings from which actual machines have been constructed. I will, however, in this connection state that, for obtaining the best results, the metal included in the magnetic circuit should be uniform in cross-section throughout the circuit—as, for instance, at $xx$, Fig. 16, it should at least be equal to the cross-section of the magnetic metal in the armature.

Figure 17:
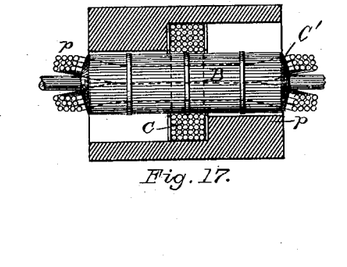
Fig. 17 is a diagrammatic view of a machine, in section, containing two exciting-helices in accordance with my invention, one of said helices being diametric and the other concentric.

While I deem it preferable to employ but one exciting-helix, or one constructed in two parts or sections either or both of which may be used at the same time, as in Figs. 13 and 14, two separate or independent helices may be employed—as, for instance, as illustrated in the sectional diagram Fig. 17, wherein a concentric helix, C, is employed, and also a divided diametrical helix, C'. The first polarizes the two ends of the armature B, and the second helix correspondingly polarizes the opposite sides of the armature, and both helices harmonize in like manner in developing opposite poles at the cheeks $p\ p$; and it will be obvious that similar but less desirable results would accrue if but one of said helices directly polarized the armature, and the other helix was relied upon for directly polarizing the shell and only polarizing the armature by induction.

A characteristic feature of all of the machines illustrated is that the magnetic metal of the armature is directly polarized by the exciting-helix, instead of having said metal polarized by induction, as heretofore in bipolar machines.

In addition to the comparatively small quantity of metal contained in the shells and of wire in the exciting-helices, it will be seen that the construction of the shells involves but little mechanical labor, and also that the helices can be cheaply wound, all of which contribute to the production of highly-efficient machines at low cost.

Some of the machines illustrated embody certain novel features of more or less value in the construction and in the arrangement of the parts, and these will be made the subjects of separate applications for Letters Patent. (See Serial No. 227,020.)

Having thus described my invention, I claim as new and desire to secure by Letters Patent—

1. In a bipolar dynamo-electric machine or electric generator, the combination, substantially as hereinbefore described, of an exciting-helix, an armature directly polarized by said helix, and a casing or shell which surrounds the helix and armature and with the latter completes the magnetic circuit.

2. In a bipolar dynamo-electric machine or electric generator, the combination, substantially as hereinbefore described, of an armature containing magnetic metal, a casing or shell, and an exciting-helix which directly polarizes said armature and shell.

3. In a bipolar dynamo-electric machine or electric generator, the combination, with an armature containing magnetic metal, of an exciting-helix which surrounds said armature diametrically and directly polarizes the armature, substantially as described.

4. In a bipolar dynamo-electric machine or electric generator, the combination of an armature containing magnetic metal, an exciting-helix which directly polarizes said armature, and a skeletonized shell inclosing the helix and armature, substantially as described.

5. The combination, substantially as hereinbefore described, of an armature, an exciting-helix surrounding said armature, and an inclosing-shell of magnetic metal polarized by said helix to form pole-faces of opposite polarity and affording a magnetic circuit which is cut by the armature-conductors alternately in opposite directions during the rotation of the armature.

RUDOLF EICKEMEYER.

Witnesses:
PHILIP F. LARNER,
HOWELL T. BARTLE.